(12) United States Patent
Okabe et al.

(10) Patent No.: US 9,435,470 B2
(45) Date of Patent: Sep. 6, 2016

(54) PIPE JOINT

(75) Inventors: Tsuneyuki Okabe, Oshu (JP); Shuji Moriya, Nirasaki (JP); Kenichi Sato, Oshu (JP); Tomohiro Nakata, Osaka (JP); Tsutomu Shinohara, Osaka (JP); Michio Yamaji, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 0 days.

(21) Appl. No.: 14/346,096

(22) PCT Filed: Sep. 11, 2012

(86) PCT No.: PCT/JP2012/073123
§ 371 (c)(1),
(2), (4) Date: Jun. 26, 2014

(87) PCT Pub. No.: WO2013/042575
PCT Pub. Date: Mar. 28, 2013

(65) Prior Publication Data
US 2014/0312617 A1    Oct. 23, 2014

(30) Foreign Application Priority Data
Sep. 22, 2011 (JP) ................. 2011-206749

(51) Int. Cl.
*F16L 25/00* (2006.01)
*F16L 19/02* (2006.01)
*F16L 19/028* (2006.01)

(52) U.S. Cl.
CPC ........ *F16L 19/0212* (2013.01); *F16L 19/0286* (2013.01)

(58) Field of Classification Search
USPC ......................... 285/331, 328, 354
See application file for complete search history.

(56) References Cited

U.S. PATENT DOCUMENTS

| | | | | |
|---|---|---|---|---|
| 1,930,833 A | * | 10/1933 | Barrett | 285/281 |
| 3,840,257 A | | 10/1974 | Moore | |
| 5,040,714 A | | 8/1991 | McManigal | |
| 5,060,987 A | * | 10/1991 | Miller | 285/328 |
| 5,066,051 A | * | 11/1991 | Weigl et al. | 285/328 |
| 5,131,692 A | | 7/1992 | Lemons | |
| 5,145,219 A | * | 9/1992 | Babuder | 285/330 |
| 5,163,721 A | * | 11/1992 | Babuder | 285/328 |
| 5,299,843 A | * | 4/1994 | Weigl et al. | 285/328 |

(Continued)

FOREIGN PATENT DOCUMENTS

| | | |
|---|---|---|
| JP | 04-228989 A | 8/1992 |
| JP | 07-081656 B2 | 9/1995 |

(Continued)

OTHER PUBLICATIONS

International Search Report dated Oct. 23, 2012, issued for PCT/JP2012/073123.

*Primary Examiner* — Aaron Dunwoody
(74) *Attorney, Agent, or Firm* — Locke Lord LLP

(57) ABSTRACT

A pipe joint for preventing fine particles generated when a male threaded member and a female threaded member are threadedly engaged with each other from entering a fluid passage thus maintaining a high degree of cleanliness. Joint members are joined to each other by a male threaded member formed on one joint member and a female threaded member formed on the other joint member. A cover portion which covers outer peripheral surfaces of abutting portions of both joint members is formed on the male threaded member.

6 Claims, 2 Drawing Sheets

(56) References Cited

U.S. PATENT DOCUMENTS

| | | | |
|---|---|---|---|
| 5,306,052 A * | 4/1994 | MeGushion | 285/328 |
| 5,829,796 A * | 11/1998 | Robinson | 285/288.1 |
| 6,416,087 B1 * | 7/2002 | Kremer | 285/328 |
| 6,547,255 B1 | 4/2003 | Donaway et al. | |
| 6,623,047 B2 * | 9/2003 | Olechnowicz et al. | 285/328 |
| 6,685,237 B1 * | 2/2004 | Robinson | 285/330 |
| 7,207,605 B2 * | 4/2007 | Olechnowicz et al. | 285/328 |
| 2001/0038206 A1 * | 11/2001 | Olechnowicz et al. | 285/328 |
| 2004/0104573 A1 * | 6/2004 | Olechnowicz et al. | 285/328 |

FOREIGN PATENT DOCUMENTS

| | | |
|---|---|---|
| JP | 2007-278341 A | 10/2007 |
| JP | 2010-096329 A | 4/2010 |

\* cited by examiner

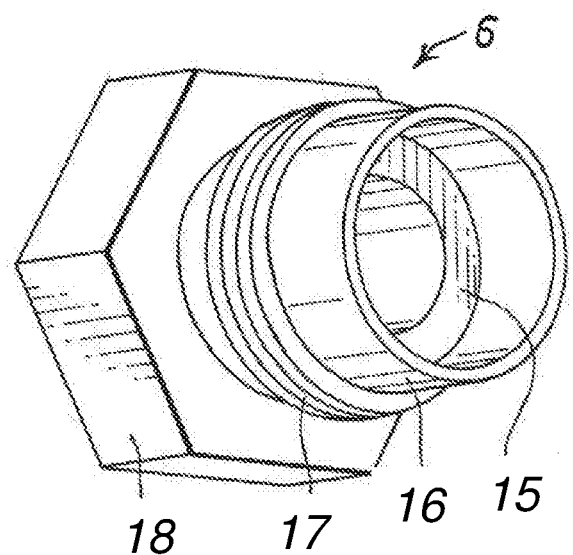

PIPE JOINT

TECHNICAL FIELD

The present invention relates to a pipe joint, and more particularly to a pipe joint suitable for applications where an extremely high degree of cleanliness is required such as semiconductor manufacturing field.

BACKGROUND ART

Conventionally, as a pipe joint suitable for applications where an extremely high degree of cleanliness is required such as semiconductor manufacturing field, there has been known a pipe joint which includes: a pair of pipe-shaped joint members respectively having fluid passages which are communicated with each other; and a circular annular gasket interposed between abutting end surfaces of both joint members, wherein the joint members are joined to each other by a male threaded member formed on one of these joint members and a female threaded member formed on the other of these joint members (patent literature 1).

CITATION LIST

Patent Literature

PTL 1: JP-A-2010-96329 (FIG. 5)

SUMMARY OF INVENTION

Technical Problem

In the above-mentioned conventional pipe joint, at the time of threadedly engaging the male threaded member and the female threaded member with each other, there exists a possibility that fine particles are generated. In this case, the fine particles enter the inside of the fluid passages thus giving rise to a possibility that a high degree of cleanliness cannot be ensured.

It is an object of the present invention to provide a pipe joint which can prevent fine particles generated from entering the inside of a fluid passage at the time of threadedly engaging a male threaded member and a female threaded member with each other thus maintaining a high degree of cleanliness.

Solution to Problem

The present invention is directed to a pipe joint which includes: a pair of pipe-shaped joint members; and a circular annular gasket which is interposed between abutting end surfaces of both joint members, wherein the joint members are joined to each other by a male threaded member formed on one of the joint members and a female threaded member formed on the other of the joint members, wherein a cover portion which covers outer peripheral surfaces of abutting portions of both joint members is formed on the male threaded member.

At the time of threadedly engaging the male threaded member and the female threaded member with each other, there exists a possibility that fine particles are generated. However, due to the formation of the cover portion which covers the outer peripheral surfaces of the abutting portions of both joint members on the male threaded member, it is possible to prevent the fine particles from entering into the inside of a fluid passage thus maintaining a high degree of cleanliness.

It is preferable that the respective joint members have the same shape, each joint member is constituted of a circular cylindrical sleeve body whose inner periphery forms a fluid passage and a flange which is integrally formed with an abutting end portion of the sleeve body, the sleeve bodies face each other in an opposed manner with a gasket interposed therebetween, and the abutting end surfaces of the flanges project from the sleeve bodies and face each other in an opposed manner with an excessive fastening preventing gap formed therebetween.

In making the sleeves abut to each other with the gasket interposed therebetween, when a distance between the abutting end surfaces of the sleeves is equal to a width of the gasket in size, a possibility that fine particles enter the fluid passage is increased. However, by making the flanges face each other in an opposed manner with the excessive fastening preventing gap formed therebetween, it is possible to acquire the duplicate fine particle intrusion preventing mechanism in combination with the cover portion of the male threaded member. By setting the excessive fastening preventing gap such that the gap becomes substantially zero when proper fastening is performed and a resistance to the fastening is increased when the further fastening is performed, the fine particle intrusion preventing mechanism can contribute not only to the prevention of the fine particle intrusion but also to the prevention of the excessive fastening.

Advantageous Effects of Invention

According to the pipe joint of the present invention, the cover portion which covers the outer peripheral surfaces of the abutting portions of both joint members is formed on the male threaded member and hence, it is possible to prevent fine particles which may be generated at the time of threadedly engaging the male threaded member and the female threaded member with each other from entering into the inside of the fluid passage thus maintaining a high degree of cleanliness.

BRIEF DESCRIPTION OF DRAWINGS

FIG. 2 is a perspective view showing a male threaded member used in the pipe joint according to the present invention.

Figure 1:
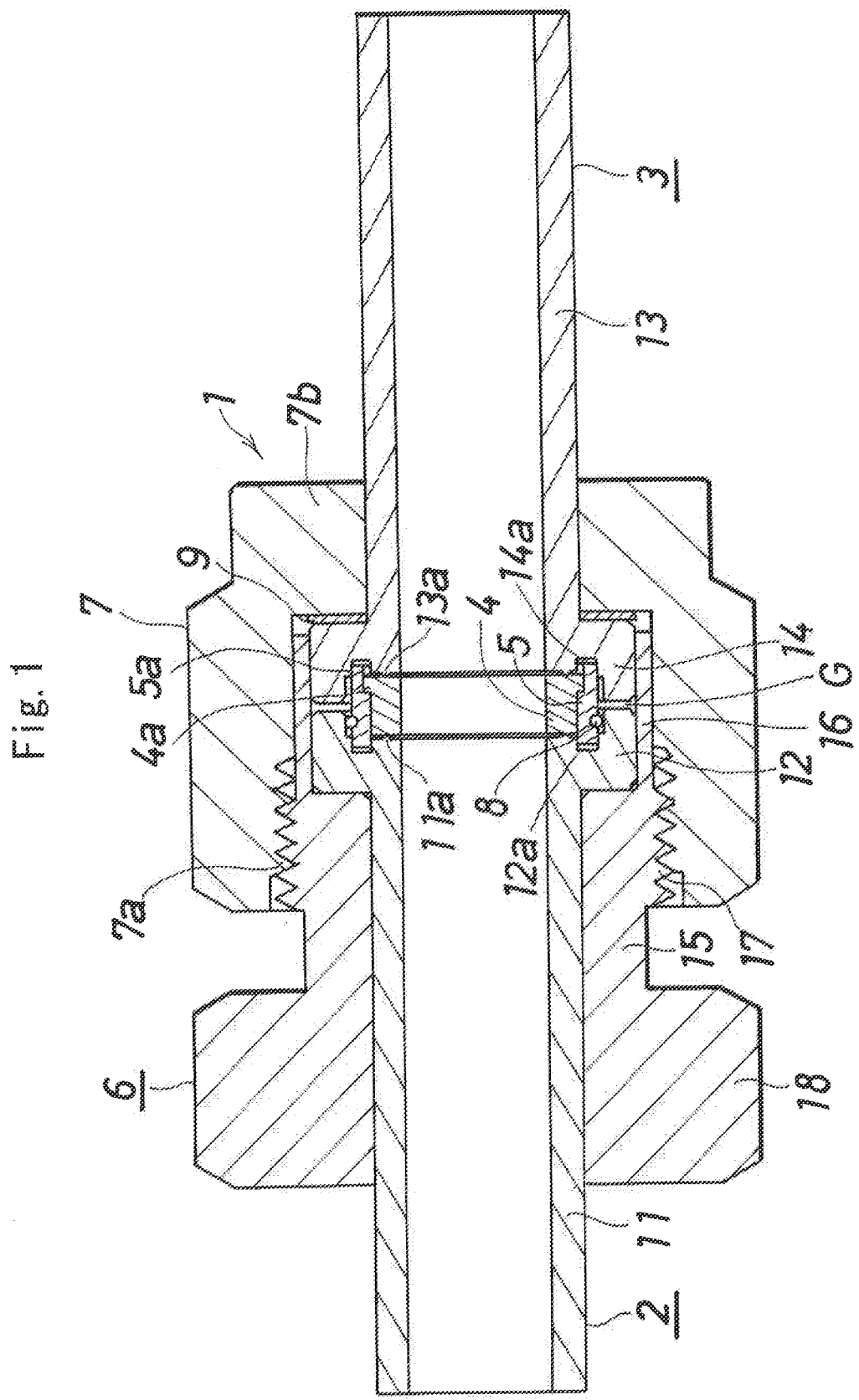
FIG. 1 is a longitudinal cross-sectional view showing one embodiment of a pipe joint according to the present invention.

REFERENCE SIGNS LIST (1): pipe joint
(2), (3): joint member
(4): gasket
(6): male threaded member
(7): female threaded member
(16): cover portion

DESCRIPTION OF EMBODIMENTS

An embodiment of the present invention is explained hereinafter by reference to drawings. In the explanation made hereinafter, left and right sides in FIG. 1 are assumed as left and right sides of a pipe joint.

FIG. 1 shows a first embodiment of a pipe joint according to the present invention. As shown in FIG. 1, a pipe joint (1) includes: first and second pipe-shaped joint members (2), (3) respectively having fluid passages which are communicated with each other; a circular annular gasket (4) which is interposed between both joint members (2), (3); a retainer (5) which holds the gasket (4) and is held by the first joint member (2); an approximately circular cylindrical male threaded member (6) which is fitted on the first joint member (2); and an approximately circular cylindrical female threaded member (7) which is fitted on the second joint member (3).

Each of the respective joint members (2), (3) is constituted of a circular cylindrical sleeve body (11), (13) whose inner periphery forms a fluid passage, and a flange (12), (14) which is integrally formed with an abutting end portion of the sleeve body (11), (13). The joint members (2), (3) have the same shape.

The gasket (4) is made of metal such as a nickel alloy, and is plastically deformed between abutting end surfaces of both joint members (2), (3) thus obtaining sealing property. An annular gasket pressing projection (11a), (13a) is formed on an abutting end surface of the sleeve body (11), (13) of the joint member (2), (3). An inner diameter of the gasket (4) is set equal to inner diameters of the respective joint members (2), (3).

A large-diameter portion (4a) having an outer diameter larger than outer diameters of other portions and an inner diameter equal to inner diameters of other portions is formed on a right end portion of the gasket (4) so that the gasket (4) is formed into a shape having a smooth inner peripheral surface and a stepped outer peripheral surface. A large-diameter portion (5a) corresponding to the large-diameter portion (4a) of the gasket (4) is formed on an inner peripheral surface of the retainer (5) so that the retainer (5) is formed into a shape having a stepped inner peripheral surface corresponding to the stepped outer peripheral surface of the gasket (4). The gasket (4) and the retainer (5) are fitted to each other such that the large-diameter portion (4a) of the gasket (4) is accommodated in the large-diameter portion (5a) of the retainer (5).

The sleeve bodies (11), (13) face each other in an opposed manner with the gasket (4) interposed therebetween, and abutting end surfaces of the flanges (12), (14) project from the sleeve bodies (11) (13) and are made to face each other in an opposed manner with an excessive fastening preventing gap (G) formed therebetween. Recessed portions (12a), (14a) for accommodating the retainer (5) are formed on the abutting end surfaces of the flanges (12), (14) respectively.

The retainer (5) is fitted in the recessed portions (12a), (14a) of the flanges (12) (14) while holding the gasket (4), while the retainer (5) is held by the first joint member (2) by means of a snap ring (8) which is formed by forming a metal-made wire material having a circular cross section into a C shape.

As also shown in FIG. 2, the male threaded member (6) Includes: a circular cylindrical body (15); a circular cylindrical cover portion (16) which projects rightward (in the axial direction) from a right end surface (an abutting end surface) of the body (15) and covers outer peripheral surfaces of the abutting portions of both joint members (2), (3); a male threaded portion (17) which is formed on an outer periphery of a right end portion (an abutting end portion) of the body (15); and a hexagonal engaging portion (18) which is formed on an outer periphery of a left end portion (an end portion on a side opposite to the abutting end portion) of the body (15). The male threaded member (6) is fitted on the first joint member (2) from a left side, and a right surface of the body (15) of the male threaded member (6) is brought into contact with a left surface of the flange (12) of the first joint member (2) from a left side.

The female threaded member (7) is a member referred to as a cap nut, and is fitted on the second joint member (3) from a right side. A female threaded portion (7a) which is threadedly engaged with the male threaded portion (17) of the male threaded member (6) is formed on an inner periphery of a left end portion of the female threaded member (7). An inwardly extending flange (7b) is formed on a right end portion of the female threaded member (7), and the inwardly extending flange (7b) is fitted on the periphery of the sleeve body (13) of the second joint member (3), and is brought into contact with a right surface of the flange (12) of the second joint member (3) from a right side.

An inner diameter of the cover portion (16) of the male threaded member (6) is set slightly larger than an outer diameter of the flanges (12) of the first and second joint members (2), (3), and an outer diameter of the cover portion (16) is set slightly smaller than an inner diameter of the female threaded member (7).

A washer (9) for preventing the co-rotation is interposed between the flange (14) of the second joint member (3) and the inwardly extending flange (7a) of the female threaded member (7).

FIG. 1 shows a state where the male threaded member (6) and the female threaded member (7) are fastened to each other by a hand (a state before the male threaded member (6) and the female threaded member (7) are completely fastened to each other), wherein distal ends of the gasket pressing projections (11a), (13a) are brought into contact with the gasket (4). Thereafter, when the male threaded member (6) and the female threaded member (7) are properly fastened to each other (with a predetermined torque value or a predetermined nut rotation amount), the gasket pressing projections (11a), (13a) bite into both surfaces of the gasket (4) and hence, high sealing property can be ensured and, at the same time, portions of the respective sleeve bodies (11), (13) where the gasket pressing projections (11a), (13a) are not formed are brought into close contact with the both surfaces of the gasket (4) over the whole surface and hence, the sealing property can be further enhanced.

At this stage, although the excessive fastening preventing gap (G) formed between the abutting end surfaces of the flanges (12), (14) becomes small, the slight gap (G) is still maintained. The excessive fastening preventing gap (G) is set such that the gap (G) becomes approximately 0 when proper fastening is performed. In a proper fastening state, the abutting end surfaces of the flanges (12), (14) are configured not to apply a force to each other or not to apply a large force to each other. When the fastening is further performed from such a state, the excessive fastening preventing gap (G) takes a negative value and hence, the abutting end surfaces of the flanges (12), (14) apply a force to each other so that a resistance to the fastening is increased whereby excessive fastening can be prevented.

At the time of threadedly engaging the male threaded member (6) and the female threaded member (7) with each other, there exists a possibility that fine particles are generated. In making the sleeve bodies (11), (13) abut each other with the gasket (4) interposed therebetween, when a distance between the abutting end surfaces of the sleeve bodies (11), (13) is equal to a width of the gasket (4), a possibility that fine particles enter the fluid passages formed in the inside of the sleeve bodies (11), (13) is increased. According to the pipe joint (1) of the present invention, the flanges (12), (14)

are arranged to face each other in an opposed manner with the excessive fastening preventing gap (G) formed therebetween, and the slight excessive fastening preventing gap (G) is closed by the cover portion (16) of the male threaded member (6) and hence, the mechanism which prevents the intrusion doubly can be constituted thus remarkably decreasing a possibility that fine particles enter the fluid passages.

INDUSTRIAL APPLICABILITY

According to the pipe joint of the present invention, it is possible to prevent fine particles generated when the male threaded member and the female threaded member are threadedly engaged with each other from entering the fluid passage and hence, by applying the pipe joint of the present invention to various kinds of applications where a high degree of cleanliness is required, the pipe joint can contribute to ensure a high degree of cleanliness.

The invention claimed is:

1. A pipe joint comprising:
   a pair of pipe-shaped joint members consisting of a first joint member and a second joint member,
   a circular annular gasket which is interposed between end surfaces of both joint members,
   a male threaded member formed on the first joint member; and
   a female threaded member formed on the second joint member,
   wherein the first and the second joint members each comprises: a cylindrical sleeve body which inner periphery forms a fluid passage; and a flange projecting from the sleeve body,
   wherein each flange is integrally formed with an end portion of each joint member, and end surfaces of the flanges face each other in an opposed manner,
   wherein an excessive fasten preventing gap is formed between the flanges,
   wherein the excessive fasten preventing gap is smaller than a thickness of the gasket,
   wherein the male threaded member comprises a male threaded portion and a cover portion,
   wherein the cover portion comprises no thread and covers outer peripheral surfaces of the excessive fasten preventing gap upon the joint members being fastened.

2. The pipe joint according to claim 1, further comprising a retainer fitted in recessed portions of the flanges, holding the gasket.

3. The pipe joint according to claim 1, the excessive fasten preventing gap is enclosed by the joint members, the gasket and the cover portion.

4. The pipe joint according to claim 1, further comprising gasket pressing projections formed on sleeve bodies of the joint members and configured to bite into surfaces of the gasket upon the male threaded member and the female threaded member being properly fastened to each other.

5. The pipe joint according to claim 2, wherein the retainer is held by one of the joint members with a snap ring.

6. The pipe joint according to claim 4, wherein the excessive fastening preventing gap is enclosed by the joint members, the cover portion and the retainer.

* * * * *